(12) United States Patent
Vijayaraghavan et al.

(10) Patent No.: US 12,014,140 B2
(45) Date of Patent: Jun. 18, 2024

(54) UTILIZING MACHINE LEARNING AND NATURAL LANGUAGE PROCESSING TO DETERMINE MAPPINGS BETWEEN WORK ITEMS OF VARIOUS TOOLS

(71) Applicant: Accenture Global Solutions Limited, Dublin (IE)

(72) Inventors: Koushik M. Vijayaraghavan, Chennai (IN); Niju Prabha, Bangalore (IN); Rajesh Nagarajan, Chennai (IN); Sarvesh Madhusudan Damle, Thane (IN); Aditi Kulkarni, Bengaluru (IN); Jayashri Sridevi, Chennai (IN); Rashmi Jhawar, Gurugram (IN); Prajwal Patrick Dsilva, Mumbai (IN); Soumya Swarup Jena, Bhubaneswar (IN); Dhiviya Dhanasekaran, Chennai (IN); Meiyarasu Selvam, Thevur (IN); Girish Hulkoti, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 267 days.

(21) Appl. No.: 17/306,629

(22) Filed: May 3, 2021

(65) Prior Publication Data
US 2022/0350967 A1 Nov. 3, 2022

(51) Int. Cl.
*G06F 40/279* (2020.01)
*G06F 8/70* (2018.01)
(Continued)

(52) U.S. Cl.
CPC ............ *G06F 40/279* (2020.01); *G06F 8/70* (2013.01); *G06F 40/166* (2020.01); *G06F 40/247* (2020.01); *G06N 20/00* (2019.01)

(58) Field of Classification Search
CPC .... G06F 40/279; G06F 40/166; G06F 40/247; G06F 8/70; G06F 21/6254; G06F 18/214;
(Continued)

(56) References Cited

U.S. PATENT DOCUMENTS 10,880,328 B2 * 12/2020 Farhady .................. G06N 3/04
2015/0073773 A1 * 3/2015 Acevedo Arizpe ... G06F 16/355
704/9
(Continued)

FOREIGN PATENT DOCUMENTS

CN 110134613 A * 8/2019 .......... G06F 11/3604
CN 112000802 A * 11/2020
(Continued)

*Primary Examiner* — Thuy Dao
(74) *Attorney, Agent, or Firm* — Harrity & Harrity, LLP

(57) ABSTRACT

A device may receive work item data identifying work items associated with requirements from different tools of a project and may perform data cleansing to remove and/or modify particular words from the work item data and to generate cleansed work item data. The device may perform natural language processing on the cleansed work item data to identify synonyms for words in the cleansed work item data and may replace abbreviations in the cleansed work item data with full form text to generate final work item data. The device may identify keywords in the final work item data and may process the final work item data, the synonyms, and the keywords, with a machine learning model, to identify mappings between work items of the final work item data and to determine a confidence score for the mappings. The device may perform actions based on the mappings and the confidence score.

20 Claims, 9 Drawing Sheets

(51) Int. Cl.
*G06F 9/445* (2018.01)
*G06F 9/455* (2018.01)
*G06F 11/07* (2006.01)
*G06F 40/166* (2020.01)
*G06F 40/247* (2020.01)
*G06N 20/00* (2019.01)

(58) Field of Classification Search
CPC ....... G06F 18/285; G06N 20/00; H04L 41/16; H04L 43/062; H04L 41/5067
See application file for complete search history.

(56) References Cited

U.S. PATENT DOCUMENTS

2019/0155722 A1* 5/2019 Gupta .................... G06N 20/00
2020/0097545 A1 3/2020 Chatterjee et al.

FOREIGN PATENT DOCUMENTS

| CN | 112199114 A | * | 1/2021 | ............ G06F 11/079 |
| EP | 3561734 A1 | | 10/2019 | |
| WO | WO-2022242923 A1 | * | 11/2022 | |

\* cited by examiner

UTILIZING MACHINE LEARNING AND NATURAL LANGUAGE PROCESSING TO DETERMINE MAPPINGS BETWEEN WORK ITEMS OF VARIOUS TOOLS

BACKGROUND

An example of a project development life cycle may include a software development life cycle. The software development life cycle is a process for planning, creating, testing, and deploying an information system that includes hardware only, software only, or a combination of hardware and software. The software development life cycle may include a requirement analysis stage, a design stage, a development and testing stage, an implementation stage, a documentation stage, an evaluation stage, and/or the like.

SUMMARY

In some implementations, a method may include receiving work item data identifying work items associated with user stories of a project, defects of the project, test cases of the project, requirements from different tools of the project, whether the requirements are satisfied, and whether the requirements affect other requirements. The method may include performing data cleansing to remove and/or modify particular words from the work item data and to generate cleansed work item data and performing natural language processing on the cleansed work item data to identify synonyms for words in the cleansed work item data. The method may include replacing abbreviations in the cleansed work item data with full form text to generate final work item data and identifying keywords in the final work item data. The method may include processing the final work item data, the synonyms, and the keywords, with a machine learning model, to identify mappings between work items of the final work item data and to determine a confidence score for the mappings, wherein the confidence score, for a plurality of the work items, provides a measure of similarity between the plurality of the work items. The method may include performing one or more actions based on the mappings and the confidence score for the mappings.

In some implementations, a device includes one or more memories and one or more processors to receive work item data identifying work items associated with user stories of a project, defects of the project, test cases of the project, requirements from different tools of the project, whether the requirements are satisfied, and whether the requirements affect other requirements. The one or more processors may perform data cleansing to remove and/or modify particular words from the work item data and to generate cleansed work item data and may perform natural language processing on the cleansed work item data to identify synonyms for words in the cleansed work item data. The one or more processors may replace abbreviations in the cleansed work item data with full form text to generate final work item data and may identify keywords in the final work item data. The one or more processors may process the final work item data, the synonyms, and the keywords, with a machine learning model, to identify mappings between work items of the final work item data and to determine a confidence score for the mappings, wherein the machine learning model was trained based on historical work item data associated with a plurality of historical projects, historical synonyms associated with the plurality of historical projects, and historical keywords associated with plurality of historical projects. The one or more processors may perform one or more actions based on the mappings and the confidence score for the mappings.

In some implementations, a non-transitory computer-readable medium may store a set of instructions that includes one or more instructions that, when executed by one or more processors of a device, cause the device to receive work item data identifying work items associated with user stories of a project, defects of the project, test cases of the project, requirements from different tools of the project, whether the requirements are satisfied, and whether the requirements affect other requirements. The one or more instructions may cause the device to perform data cleansing to remove and/or modify particular words from the work item data and to generate cleansed work item data and perform natural language processing on the cleansed work item data to identify synonyms for words in the cleansed work item data. The one or more instructions may cause the device to replace abbreviations in the cleansed work item data with full form text to generate final work item data and identify keywords in the final work item data. The one or more instructions may cause the device to process the final work item data, the synonyms, and the keywords, with a machine learning model, to identify mappings between work items of the final work item data and to determine a confidence score for the mappings and determine whether the confidence score for the mappings satisfies a threshold; and cause the mappings to be utilized by user devices associated with the work item data.

DETAILED DESCRIPTION

Figure 1A:
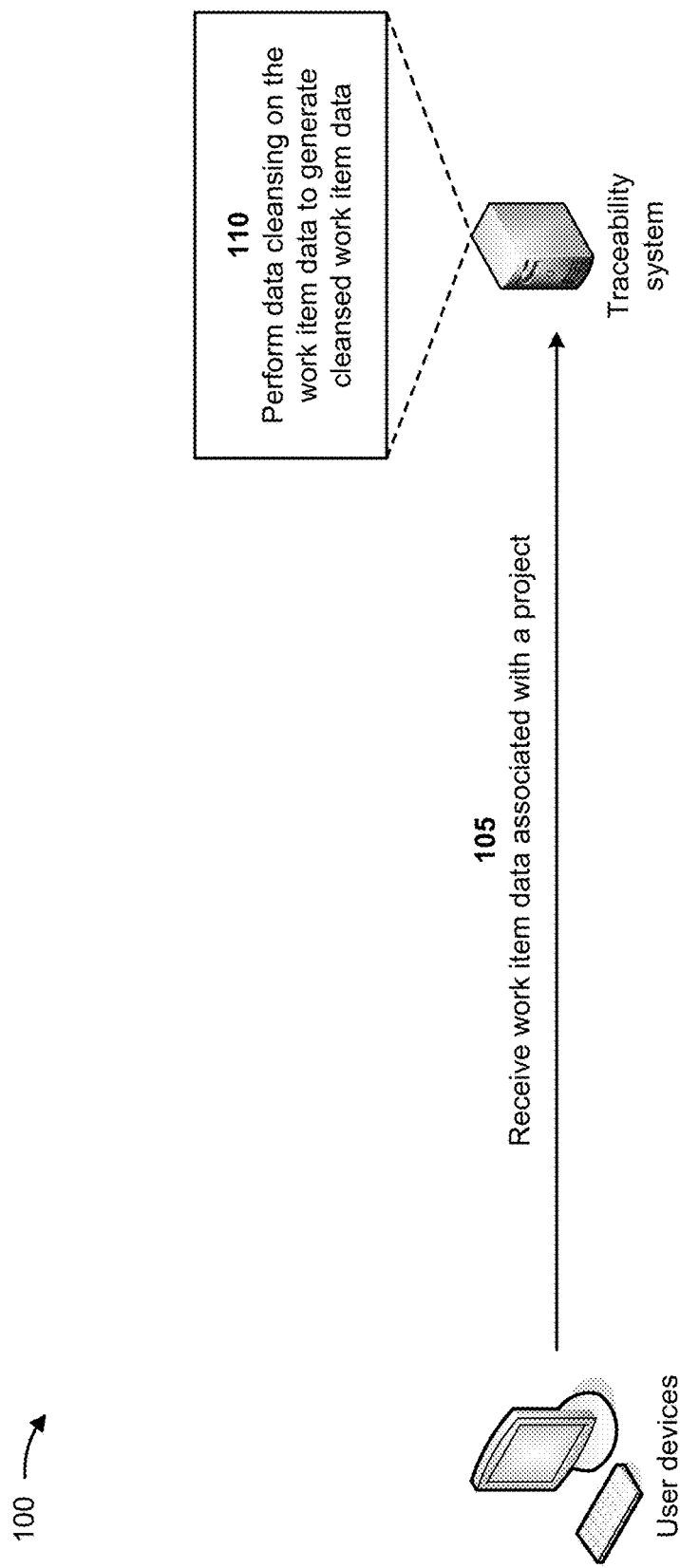
FIGS. 1A-1E are diagrams of an example implementation described herein.

The following detailed description of example implementations refers to the accompanying drawings. The same reference numbers in different drawings may identify the same or similar elements.

Various tools (e.g., an issue tracking tool, an application life-cycle tool, a project management tool, a workflow management tool, and/or the like) may be utilized for completing a project, such as a software development project. Each of the tools may generate multiple work items (e.g., tasks) associated with user stories, defects, requirements, test cases, and/or the like. Users may be required to satisfy multiple work items from the various tools in order to complete the project. However, because each of the tools may generate multiple work items associated with user stories, defects, requirements, test cases, and/or the like, correlating the work items from the various tools may be difficult, done improperly, and/or the like. Furthermore, a project may include several releases, which may increase the difficulty in tracking multiple and/or related work items, correlating work items related to different releases, and/or the like.

If the work items from the various tools users are not correlated, improperly correlated, and/or the like, users may be unable to track the progress of related work items, determine whether the work items are satisfied, determine whether a work items affects another work item (e.g., a work item that has an impact on defects and/or source code), and/or the like. Failure to track the progress of related work items, determine whether the work items are satisfied, determine whether a work items affects another work item, and/or the like may result in a failure to complete a work item, improperly determining that a work item is completed, releasing a software product with defects resulting from incomplete work items, and/or the like. Thus, current techniques for implementing software traceability waste computing resources (e.g., processing resources, memory resources, communication resources, and/or the like), networking resources, and/or the like associated with incorrectly and inefficiently determining that work items are satisfied, releasing a software product with defects due to unsatisfied work items, handling complaints associated with the defective software product, modifying the defective software product, and/or the like.

Some implementations described herein relate to a traceability system that utilizes machine learning and natural language processing to determine mappings between work items of various tools. For example, the traceability system may receive work item data identifying work items associated with user stories of a project, defects of the project, test cases of the project, requirements from different tools of the project, whether the requirements are satisfied, and whether the requirements affect other requirements. The traceability system may perform data cleansing to remove and/or modify particular words from the work item data and to generate cleansed work item data and may perform natural language processing on the cleansed work item data to identify synonyms for words in the cleansed work item data. The traceability system may replace abbreviations in the cleansed work item data with full form text to generate final work item data and may identify keywords in the final work item data. The traceability system may process the final work item data, the synonyms, and the keywords, with a machine learning model, to identify mappings between work items of the final work item data and to determine a confidence score for the mappings, wherein the confidence score, for a plurality of the work items, provides a measure of similarity between the plurality of the work items. The traceability system may perform one or more actions based on the mappings and the confidence score for the mappings.

In this way, the traceability system utilizes machine learning and natural language processing to efficiently determine mappings between work items of various tools. The traceability system may suggest and aid in achieving traceability and/or mappings between work items ranging across a project lifecycle by utilizing a machine learning model in combination with multiple procedures, such as data cleansing, synonyms matching, utilizing an exhaustive dictionary of process and/or project keywords and abbreviations, and/ or the like. The traceability system may suggest the mappings between the work items based on advanced neural networks. This, in turn, conserves computing resources, networking resources, and/or the like that would otherwise have been consumed in incorrectly and inefficiently determining that work items are satisfied, releasing a software product with defects due to unsatisfied work items, handling complaints associated with the defective software product, modifying the defective software product, and/or the like.

FIGS. 1A-1E are diagrams of an example 100 associated with utilizing machine learning and natural language processing to determine mappings between work items of various tools. As shown in FIGS. 1A-1E, example 100 includes user devices associated with users and a traceability system. Each of the user devices may include a laptop computer, a mobile telephone, a desktop computer, and/or the like associated with a user. The traceability system may include a system that utilizes machine learning and natural language processing to determine mappings between work items of various tools. Further details of the user devices and the traceability system are provided elsewhere herein.

As shown in FIG. 1A, and by reference number 105, the traceability system receives work item data associated with a project. The work item data may include a plurality of work items that are associated with the project and/or generated using a variety of different tools. For example, the work item data may include a work item that is associated with (e.g., created based on) a user story (e.g., a requirement and/or a request written from the perspective of an end user), an epic (e.g., a collection of user stories), an initiative (e.g., a collection of epics), a defect, a requirement (e.g., a requirement of the project and/or requirements associated with (or received from) different tools, among other examples), a test case, and/or the like.

In some implementations, a work item, of the plurality of work items, includes a title portion and a description portion. The title portion may include information identifying the work item (e.g., a unique identifier associated with the work item), information identifying a type (e.g., a test case, a requirement, a defect, a user story, and/or the like) associated with the work item, information identifying a tool used to generate the work item, information identifying the project, and/or the like.

The description portion may include a content of the work item. For example, the description portion may include a user story, an epic, an initiative, information associated with a defect, information identifying a requirement associated with the project, information indicating whether the requirement is satisfied and/or completed, information indicating whether the requirement affects another requirement, information identifying the other requirement, information identifying an error or defect associated with the work item, information identifying a task associated with the work item, information associated with a test case, and/or the like.

In some implementations, the work item data is received from one or more user devices associated with one or more tools used to generate the plurality of work items, manage the project, and/or the like. For example, the traceability system may receive the work items, of the plurality of work items included in the work item data, from a user device associated with an issue tracking tool, an application lifecycle tool, a project management tool, a workflow management tool, and/or the like. The traceability system may receive the work items periodically (e.g., hourly, daily, weekly, and/or the like), based on an occurrence of an event (e.g., a user device receiving a user input indicating that the work item data is to be provided to the traceability system, a creation of a work item by a tool, a change to a work item, a change to a status (e.g., not started, started, in progress, and/or complete, among other examples) of a work item, and/or the like), based on providing a request for work item data to a user device, and/or the like.

As shown by reference number 110, the traceability system performs data cleansing on the work item data to generate cleansed work item data. For example, the traceability system may perform data cleansing to remove repetitive words, to remove stop words, to remove hypertext tags, to remove absurd words (e.g., words having no meaning, words unrelated to the work item data, and/or nonsensical words), and/or the like from the work item data. Alternatively, and/or additionally, the traceability system may convert uppercase text to lowercase text, strip white space, perform stemming, perform lemmatization, spell out abbreviations and acronyms, remove sparse words (e.g., words that are uncommon according to a domain-specific corpus), and/or the like.

Figure 1B:
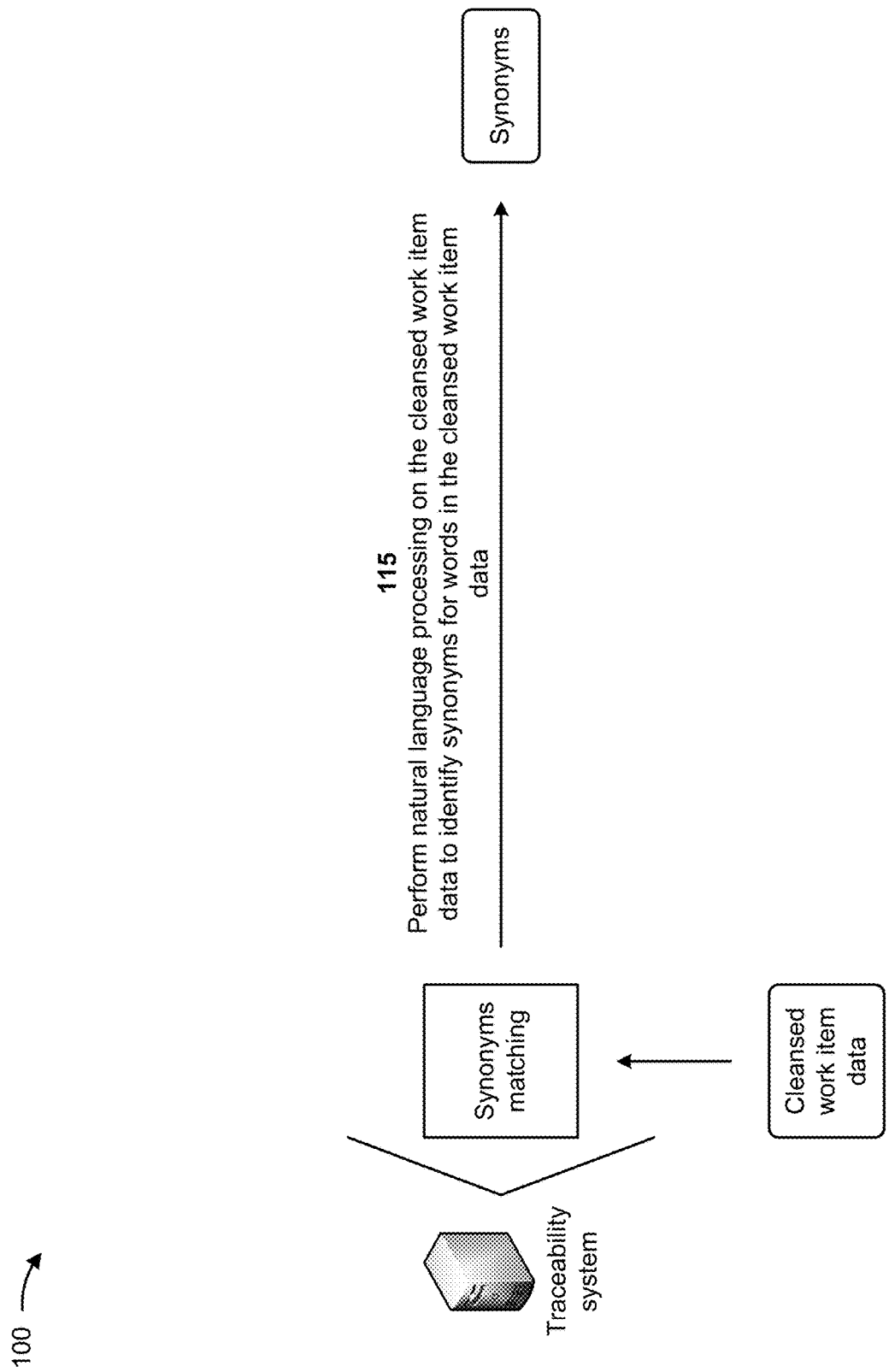

As shown in FIG. 1B, and by reference number 115, the traceability system performs natural language processing (NLP) on the cleansed work item data to identify synonyms for words in the cleansed work item data. In some implementations, the traceability system determines vectors for words in the cleansed work item data. The traceability system may determine a similarity (e.g., a cosine similarity) between each vector and all of the other vectors. The traceability system may identify a set of words as synonyms when the similarity between the vectors determined for the set of words satisfies a similarity threshold. In some implementations, the traceability system identifies matching words in the cleansed work item data. The traceability system may perform NLP on the matching words to identify synonyms for the matching words.

Figure 1C:
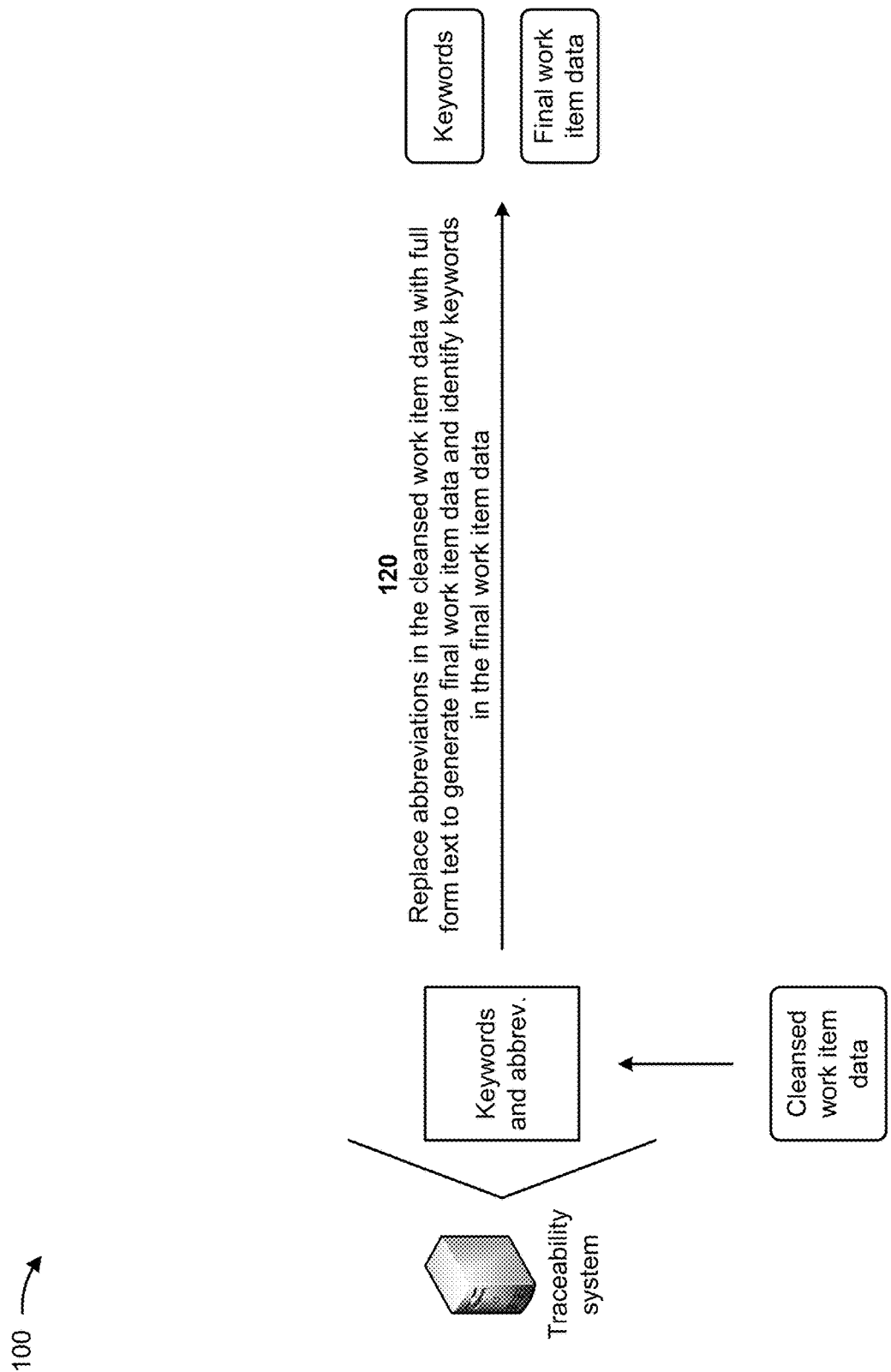

As shown in FIG. 1C, and by reference number 120, the traceability system replaces abbreviations in the cleansed work item data with full form text to generate final work item data and identifies keywords in the final work item data. In some implementations, the traceability system utilizes a depository of abbreviations associated with the project to generate the final work data. The depository may include a data structure (e.g., a database, a table, a list, and/or the like) storing information associating abbreviations with full form text corresponding to the abbreviations.

In some implementations, the traceability system obtains the data in the depository from historical work items, information input by a user, and/or the like. Alternatively, and/or additionally, the traceability system may obtain the data in the depository from another device (e.g., a third-party server device).

In some implementations, the traceability system performs NLP to identify keywords in the final work item data. In some implementations, the NLP includes a token-based NLP technique, such as a technique using regular expressions, to identify the keywords. For example, the traceability system may reference a data structure that stores regular expressions that may be used to identify a keyword associated with the project, a work item, and/or the like. The traceability system may use the regular expressions to identify the keyword based on comparing the regular expressions and information included in the final work item data.

Additionally, or alternatively, the NLP includes an approximation-based NLP technique, such as a fuzzy text search technique, to identify the keywords. For example, the traceability system may execute an approximation-based NLP technique to identify data that satisfies a threshold level of similarity with data stored in a data structure. In this case, the traceability system may set a threshold level of similarity (e.g., a percentage, a number of characters, and/or the like), and may compare information included in the final work order data to information stored in the data structure. If the traceability system determines that the threshold level of similarity is satisfied, the traceability system may identify the information as a keyword.

In some implementations, the traceability system uses multiple NLP techniques. The traceability system may filter outputs of the multiple NLP techniques into a set of values identifying the keywords. For example, the traceability system may identify a first set of values using a first one or more NLP techniques. Additionally, the traceability system may identify a second set of values using a second one or more NLP techniques. In some implementations, a mixture of overlapping values and conflicting values may occur. In these implementations, the traceability system may address the conflicting values by filtering the first set of values and the second set of values into a third set of values that excludes duplicate values, excludes conflicting values (e.g., by selecting one value, of two conflicting values, using a rule, such a threshold), and/or the like. The traceability system may use the third set of values as the set of values identifying the keywords.

In some implementations, the traceability system executes one or more of the above-mentioned NLP techniques on a particular type of work item, on work items received from a particular tool, on a particular field or group of fields within a work item, and/or the like. Additionally, or alternatively, the traceability system may take an average, or a weighted average, of the outputs of the one or more NLP techniques being deployed to identify the keywords. As an example, the traceability system may assign a weight to an output associated with each additional NLP technique and may take an average or a weighted average to identify the keywords.

Figure 1D:
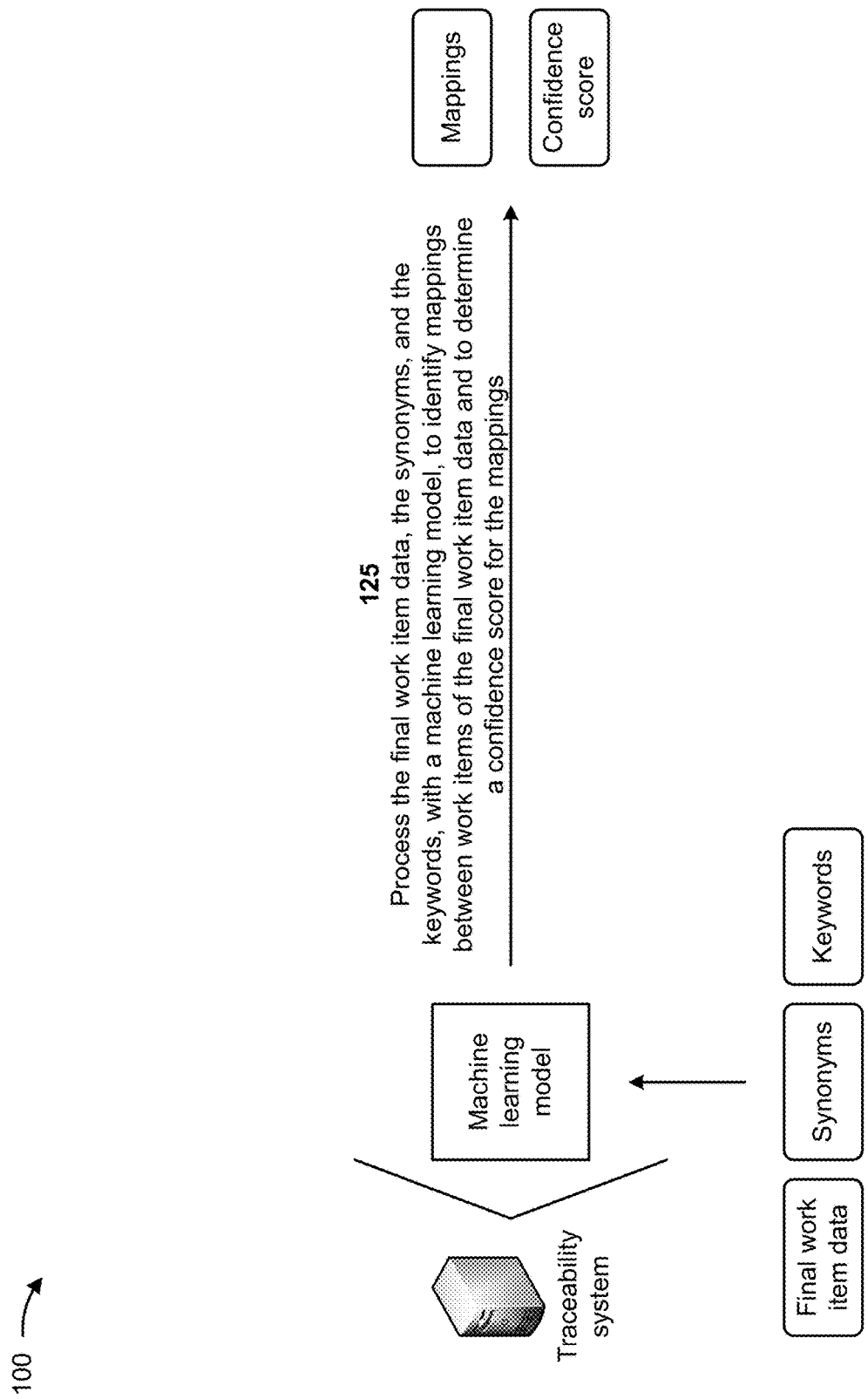

As shown in FIG. 1D, and by reference number 125, the traceability system processes the final work item data, the synonyms, and the keywords, with a machine learning model, to identify mappings between work items of the final work item data and to determine a confidence score for the mappings. In some implementations, the traceability system trains the machine learning model to identify the mappings between the work items and to determine the confidence scores for the mappings. The traceability system may train the machine learning model based on historical work item data associated with a plurality of historical projects, historical synonyms associated with the plurality of historical projects, and/or historical keywords associated with the plurality of historical projects.

The machine learning model may be trained to determine, based on work item data associated with a project, synonyms associated with a project, and keywords associated with a project, mappings between work items included in the work item data and a confidence score that reflects a measure of confidence that the mappings are accurately determined for the work items. In some implementations, the traceability system trains the machine learning model in a manner similar to that described below with respect to FIG. 2. Alternatively, and/or additionally, the traceability system may obtained a trained machine learning model from another device.

In some implementations, the machine learning model may include a fuzzy model that utilizes a Levenshtein distance to identify mappings between the work items of the final work item data. The traceability system may determine quantities of substitutions needed to transform textual strings of the final work item data into different textual strings. The traceability system may determine Levenshtein distances between the textual strings and the different textual strings based on the quantities of substitutions. The Levenshtein distance between a textual string and a different textual string may correspond to a minimum quantity of single-character edits (e.g., insertions, deletions, and/or substitutions) required to change the textual string into the different textual string.

The traceability system may identify the mappings between the work items of the final work item data based on the Levenshtein distances. For example, the traceability system may identify a mapping between a first work item and a second work item based on the Levenshtein distance of a textual string (e.g., a textual string included in a title portion of a work item, a description portion of a work item, and/or the like) in the first work item and a textual string in the second work item (e.g., the different textual string) satisfying a threshold (e.g., less than 3 single-character edits, less than 5 single-character edits, less than 15 single-character edits, and/or the like).

In some implementations, the mappings are identified based on the title portion and/or the description portion of each work item included in the final work item data. The traceability system may perform a cross correlation analysis based on the title portions and/or the description portions and may predict possible associations between the work items based on the cross correlation analysis. The traceability system may identify the mappings between the work items based on predicting the possible associations.

As an example, the traceability system may perform a textual analysis to determine a contextual similarity between a title portion of a first work item and a title portion of a second work item and/or between a description portion of the first work item and a description portion of the second work item. The traceability system may generate mappings between portions of the first work item and the second work item and a confidence score associated with the mappings based on performing the textual analysis.

In some implementations, the mappings are associated with bi-directional traceability. Bi-directional traceability may include forward traceability of the project (e.g., determining whether every requirement of the project is satisfied) and backward traceability (e.g., determining whether a scope of the project unnecessarily exceeds the requirements for the project). As an example, the first work item may include information identifying a requirement associated with the project and the second work item may include information associated with a test case. In some implementations, the first work item is generated using a first tool and the second work item is generated using a second, different tool. In some implementations, the first work item and the second work item are generated using the same tool.

The traceability system may identify a portion of the description of the second work item associated with testing for the requirement based on performing the textual analysis. The traceability system may enable forward traceability by mapping the requirement in the first work item to the identified portion of the second work item based on the identified portion being associated with testing for the requirement. The traceability system may enable backward traceability by mapping the identified portion of the second work item to the requirement in the first work item. In this way, the traceability system enables bi-directional traceability across multiple, different tools utilized by multiple different users.

In some implementations, the traceability system determines a quality score associated with a work item and/or a quality score associated with a tool. For example, the traceability system may determine a quality score for a work item based on data (e.g., content included in the title portion and/or the description portion) included in the work item.

In some implementations, the traceability system determines the quality score for a work item based on a length of a description portion of the work item. The traceability system may determine a quantity of words included in the description portion and may determine the quality score based on the quantity of words. For example, the traceability system may determine a first quality score (e.g., short, poor, 2 (e.g., from a range of quality scores from 0 through 10, and/or the like) for the work item when the quantity of words is within a first range (e.g., 0 through 10). The traceability system may determine a second quality score (e.g., not short, good, 8 (e.g., from a range of quality scores from 0 through 10, and/or the like) for the work item when the quantity of words is within a second range (e.g., 11 through 100). The traceability system may determine a third quality score (e.g., long, poor, 2 (e.g., from a range of quality scores from 0 through 10, and/or the like) for the work item when the quantity of words is within a third range (e.g., greater than 101).

In some implementations, the traceability system determines the quality score for a work item based on a quantity of vague words (e.g., I, he, she, it, they, today, tomorrow, and/or the like) included in the title portion and/or the description portion of the work item. The traceability system may compare words included in the title portion and/or the description portion to a group of vague words included in a database. The traceability system may determine the quantity of vague words included in the title portion and/or the description portion based on the comparison.

The traceability system may determine a quality score for the work item based on the quantity of vague words included in the title portion and/or the description portion of the work item. For example, the traceability system may determine a first quality score for the work item based on the quantity of vague words satisfying a first threshold and may determine a second quality score based on the quantity of vague words satisfying a second threshold. The first quality score may be greater than the second quality score based on the first threshold being less than the second threshold.

In some implementations, the traceability system determines the quality score for a work item based on a quantity of duplicate words included in the title portion and/or the description portion of the work item. The traceability system may compare words included in the title portion and/or the description portion the other words in the title portion and/or the description portion. The traceability system may determine the quantity of duplicate words included in the title portion and/or the description portion based on the comparison.

The traceability system may determine a quality score for the work item based on the quantity of duplicate words included in the title portion and/or the description portion of the work item. For example, the traceability system may determine a first quality score for the work item based on the quantity of duplicate words satisfying a first threshold and may determine a second quality score based on the quantity of duplicate words satisfying a second threshold. The first quality score may be greater than the second quality score based on the first threshold being less than the second threshold.

In some implementations, the traceability system determines a quality score for a work item based on the quality score determined for the work item based on the length of the title portion and/or the description portion, the quality score determined for the work item based on the quantity of vague words, and/or the quality score determined for the work item based on the quantity of duplicate words. For example, the traceability system may determine a quality score for a work item based on determining an average of the quality score determined for the work item based on the length of the title portion and/or the description portion, the quality score determined for the work item based on the quantity of vague words, and/or the quality score determined for the work item based on the quantity of duplicate words.

The traceability system may determine a quality scores associated with a tool based on quality scores determined for work items generated using the tool. For example, the traceability system may calculate an average quality score for a percentage (e.g., 50%, 75%, 100%, and/or the like) of work items generated using a tool and may determine a quality score associated with the tool based on the average quality score.

Figure 1E:
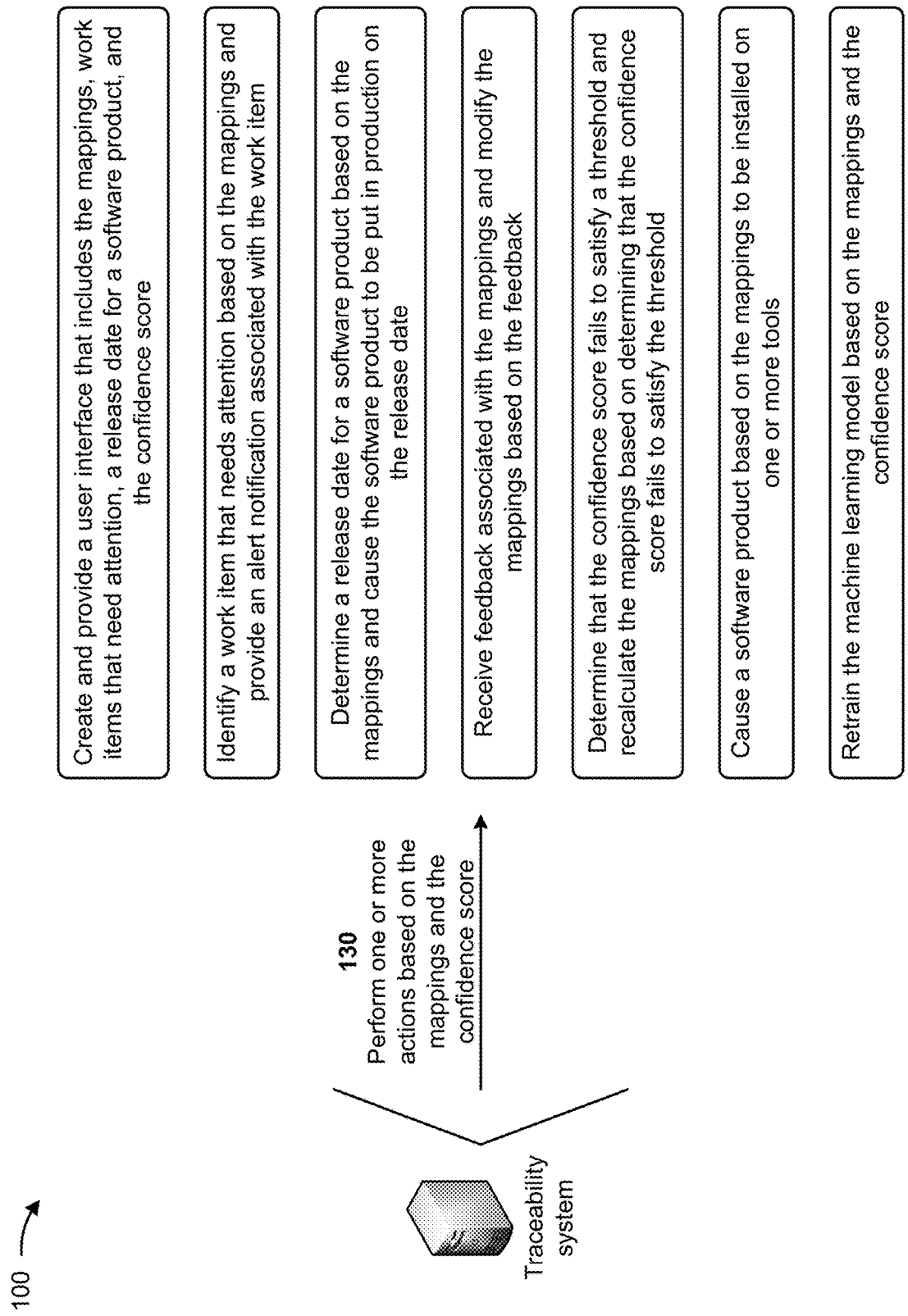

As shown in FIG. 1E, and by reference number 130, the traceability system performs one or more actions based on the mappings and the confidence score. In some implementations, the one or more actions include the traceability system creating and/or providing a user interface that includes the mappings, work items that need attention, a release date for a software project, and/or the confidence score associated with the mappings. The traceability system may determine the release date for the software project based on the mappings. In some implementations, the traceability system causes the software product to be put in production, installed on one or more tools, and/or the like on the release date.

In some implementations, the one or more actions include the traceability system identifying a work item that needs attention based on the mappings and providing an alert notification associated with the work item. For example, the traceability system may provide the alert notification via the user interface. The alert notification may include information identifying the work item, information identifying a work item mapped to the work item that needs attention, and/or the like. Alternatively, and/or additionally, the traceability system may cause the work item that needs attention to be displayed in a particular color (e.g., red), displayed in a particular portion of the user interface, and/or the like.

In some implementations, the one or more actions include the traceability system receiving feedback associated with the mappings and modifying the mappings based on the feedback. For example, a user may review the mappings provided for display via the user interface generated and/or provided by the traceability system. The user may identify an incorrect mapping and may input, via the user interface, feedback including information identifying the incorrect mapping, information identifying a correction to the incorrect mapping, and/or the like. The traceability system may receive the feedback and may modify the incorrect mapping based on the feedback.

In some implementations, the one or more actions include the traceability system determining that the confidence score fails to satisfy a threshold and recalculating the mappings based on determining that the confidence score fails to satisfy the threshold. In some implementations, the traceability system recalculates the mappings in a manner similar to that described above.

In some implementations, the one or more actions include the traceability system retraining the machine learning model based on the mappings and/or the confidence score. The traceability system may utilize the mappings and/or the confidence score as additional training data for retraining the machine learning model, thereby increasing the quantity of training data available for training the machine learning model. Accordingly, the traceability system may conserve computing resources associated with identifying, obtaining, and/or generating historical data for training the machine learning model relative to other systems for identifying, obtaining, and/or generating historical data for training machine learning models.

As described above, the traceability system utilizes machine learning and NLP to efficiently determine mappings between work items of various tools. The traceability system may suggest and aid in achieving traceability and/or mappings between work items ranging across a project lifecycle by utilizing a machine learning model in combination with multiple procedures, such as data cleansing, synonym matching, utilizing an exhaustive dictionary of process and/or project keywords and abbreviations, and/or the like. The traceability system may suggest the mappings between the work items based on advanced neural networks. This, in turn, conserves computing resources, networking resources, and/or the like that would otherwise have been consumed in incorrectly and/or inefficiently determining that work items are satisfied, releasing a software product with defects due to unsatisfied work items, handling complaints associated with the defective software product, modifying the defective software product, and/or the like.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
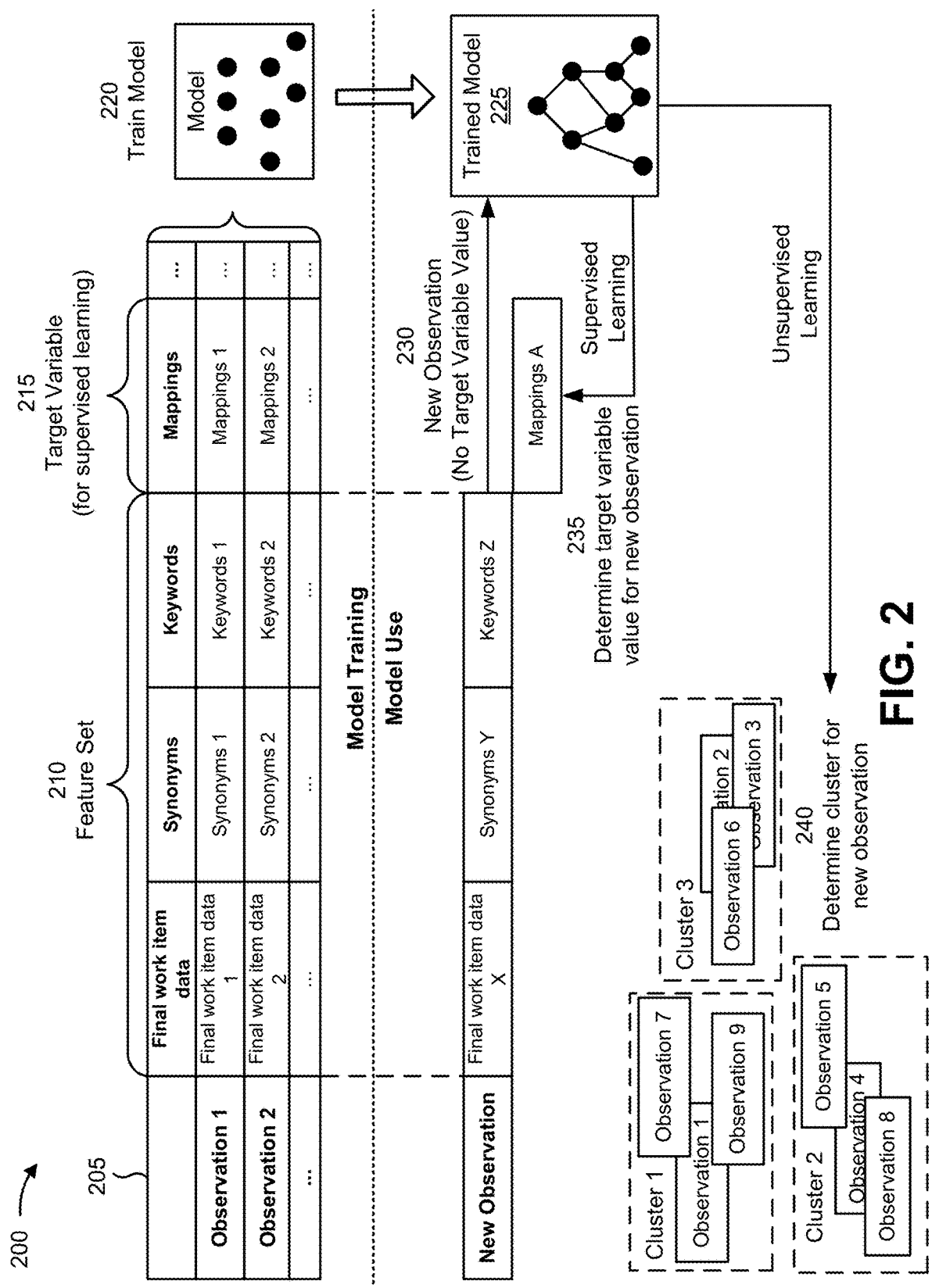
FIG. 2 is a diagram illustrating an example of training and using a machine learning model in determining mappings between work items of various tools.

FIG. 2 is a diagram illustrating an example 200 of training and using a machine learning model in connection with determining mappings between work items of various tools. The machine learning model training and usage described herein may be performed using a machine learning system. The machine learning system may include or may be included in a computing device, a server, a cloud computing environment, and/or the like, such as the traceability system described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the traceability system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the traceability system. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of final work item data, a second feature of synonyms, a third feature of keywords, and so on. As shown, for a first observation, the first feature may have a value of final work item data 1, the second feature may have a value of synonyms 1, the third feature may have a value of keywords 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable is mappings, which has a value of mappings 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of final work item data X, a second feature of synonyms Y, a third feature of keywords Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict mappings A for the target variable of the cluster for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a final work item data cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a synonyms cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process for determining mappings between work items of various tools. The machine learning system enables recognition and/or identification of tens, hundreds, thousands, or millions of features and/or feature values for tens, hundreds, thousands, or millions of observations, thereby increasing accuracy and consistency and reducing delay associated with determining mappings between work items of various tools relative to requiring computing resources to be allocated for tens, hundreds, or thousands of operators to manually determine mappings between work items of various tools.

As indicated above, FIG. 2 is provided as an example. Other examples may differ from what is described in connection with FIG. 2.

Figure 3:
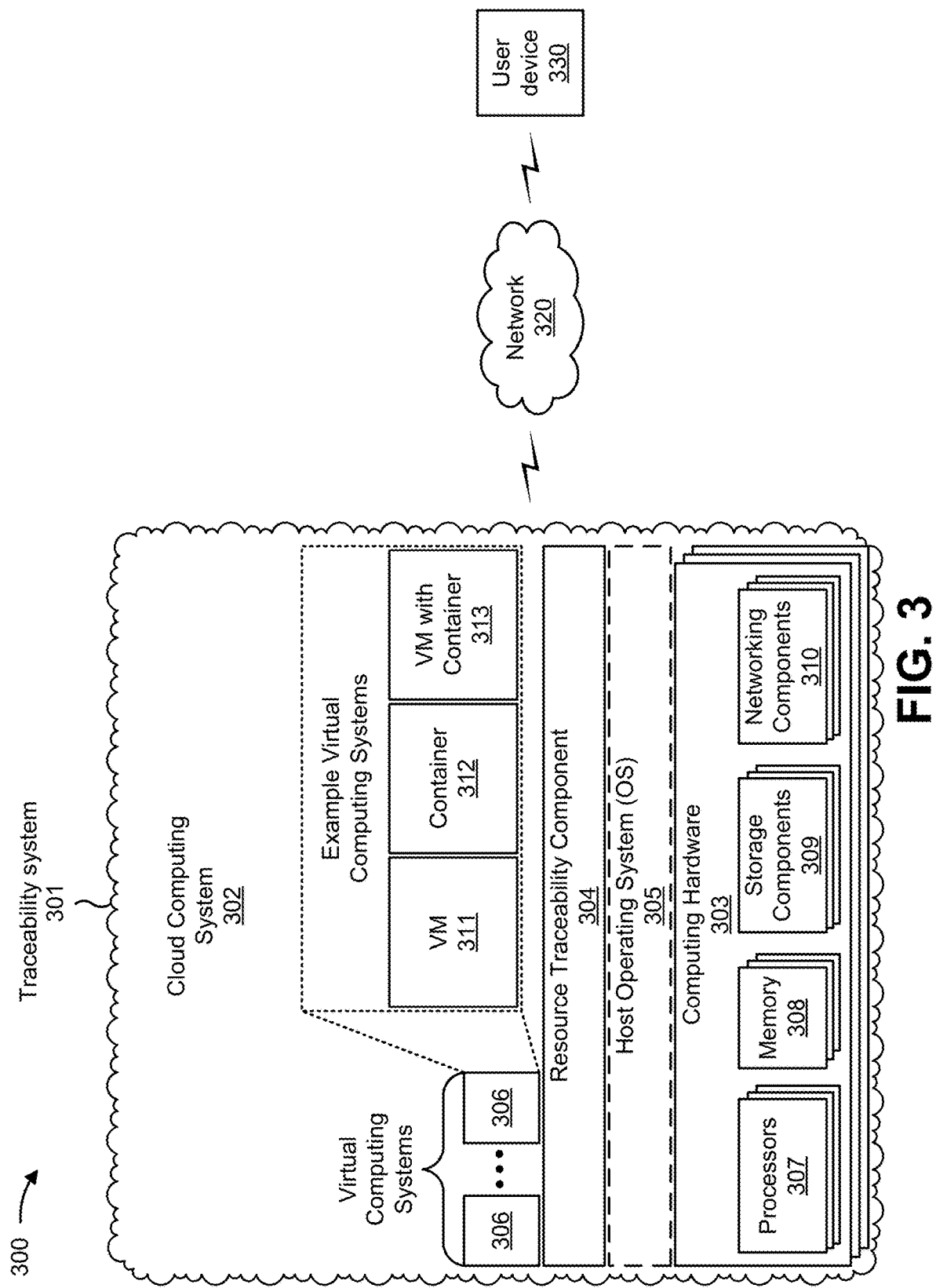
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a traceability system 301, which may include one or more elements of and/or may execute within a cloud computing system 302. The cloud computing system 302 may include one or more elements 303-313, as described in more detail below. As further shown in FIG. 3, environment 300 may include a network 320 and/or a user device 330. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the traceability system 301 may include one or more elements 303-313 of the cloud computing system 302, may execute within the cloud computing system 302, and/or may be hosted within the cloud computing system 302, in some implementations, the traceability system 301 may not be cloud-based (e.g., may be implemented outside of a cloud computing system) or may be partially cloud-based. For example, the traceability system 301 may include one or more devices that are not part of the cloud computing system 302, such as device 400 of FIG. 4, which may include a standalone server or another type of computing device. The traceability system 301 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or the like, and/or a combination of these or other types of networks. The network 320 enables communication among the devices of environment 300.

User device 330 includes one or more devices capable of receiving, generating, storing, processing, and/or providing information, as described elsewhere herein. User device 330 may include a communication device and/or a computing device. For example, user device 330 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. User device 330 may communicate with one or more other devices of environment 300, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
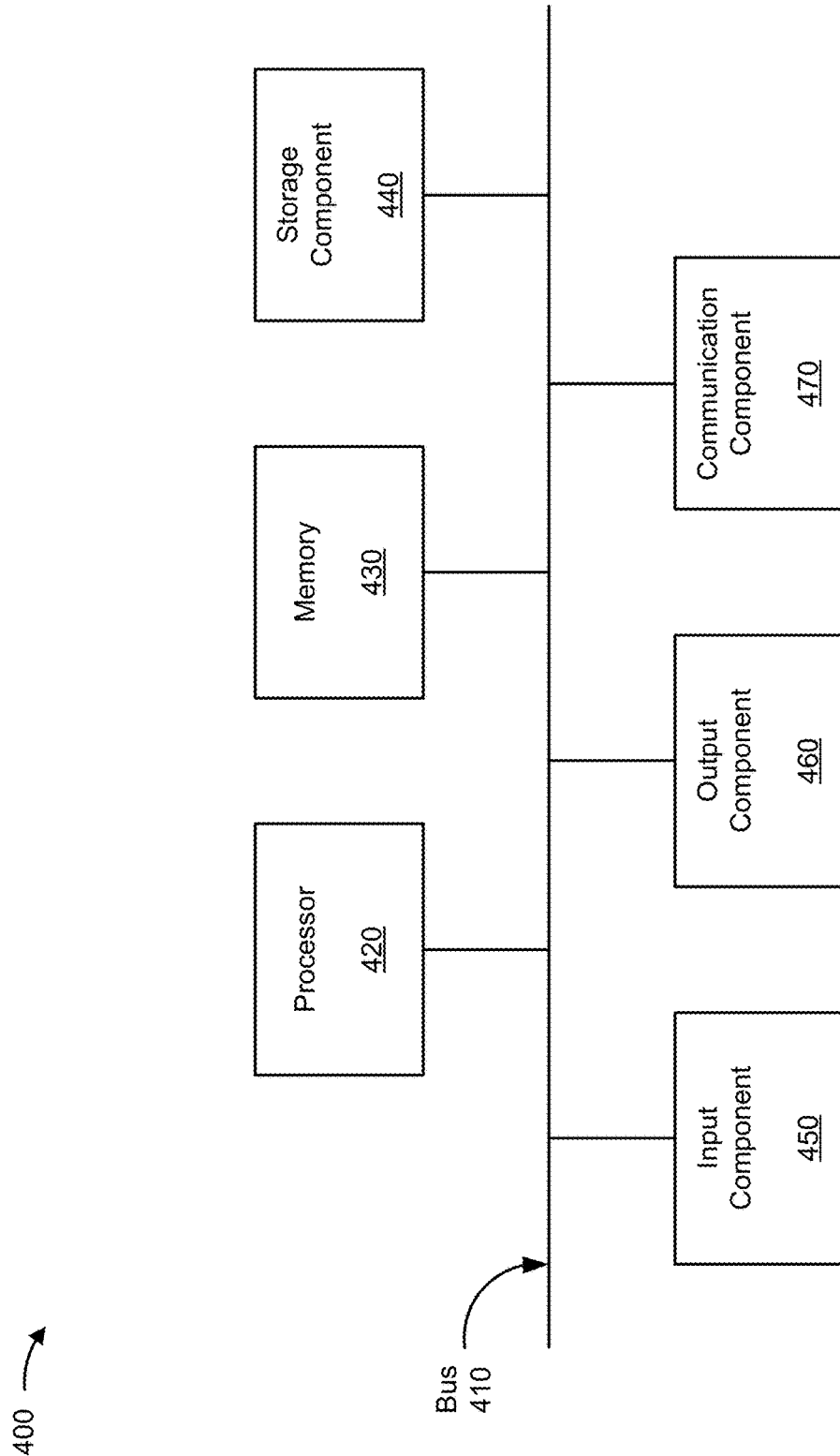
FIG. 4 is a diagram of example components of one or more devices of FIG. 3.

FIG. 4 is a diagram of example components of a device 400, which may correspond to traceability system 301 and/or user device 330. In some implementations, traceability system 301 and/or user device 330 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random-access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid-state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
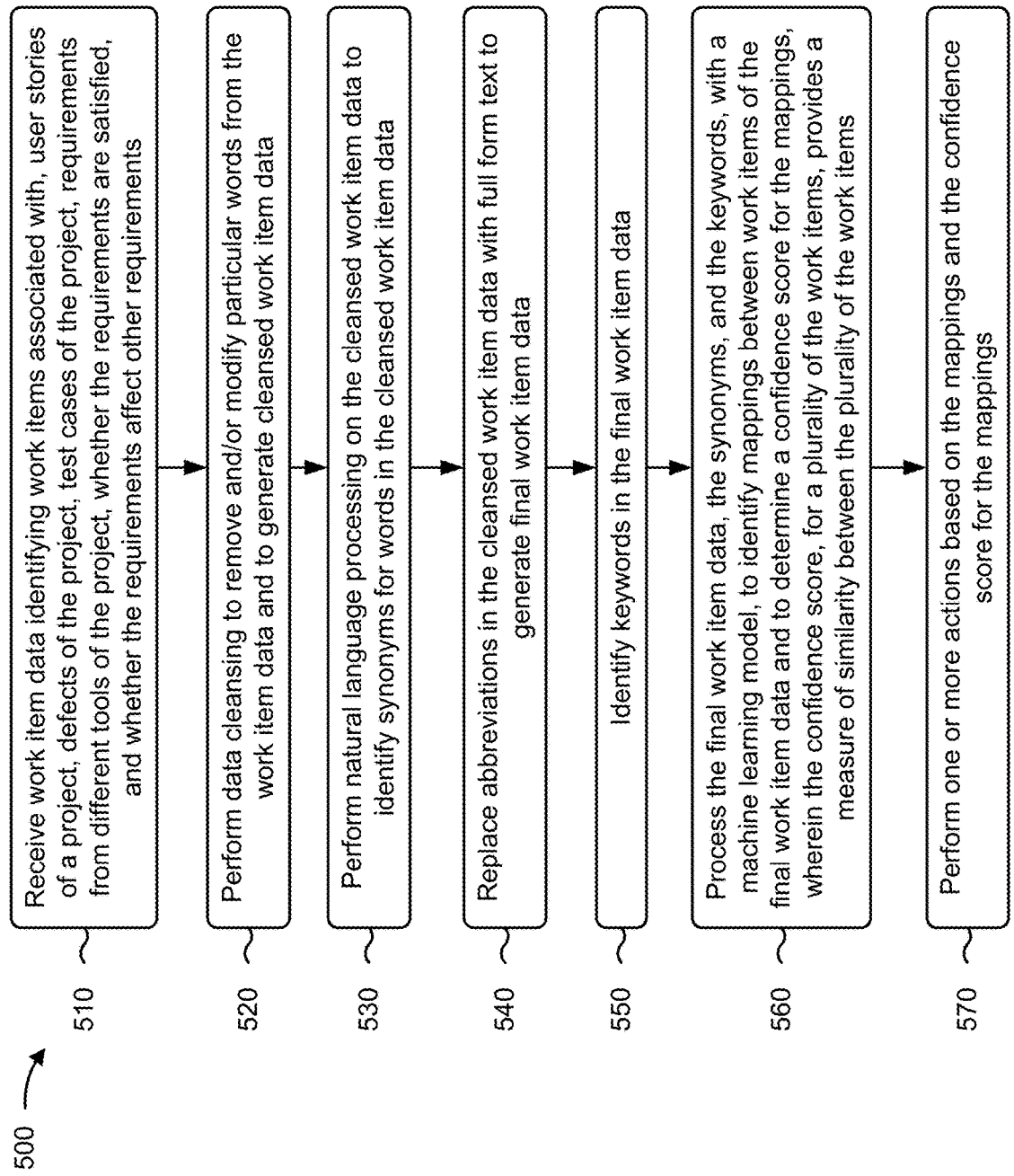
FIG. 5 is a flowchart of an example process for utilizing machine learning and natural language processing to determine mappings between work items of various tools.

FIG. 5 is a flowchart of an example process 500 for utilizing machine learning and natural language processing to determine mappings between work items of various tools. In some implementations, one or more process blocks of FIG. 5 may be performed by a device (e.g., traceability system 301). In some implementations, one or more process blocks of FIG. 5 may be performed by another device or a group of devices separate from or including the device, such as a user device (e.g., user device 330). Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include receiving work item data identifying work items associated with user stories of a project, defects of the project, test cases of the project, requirements from different tools of the project, whether the requirements are satisfied, and whether the requirements affect other requirements (block 510). For example, the device may receive work item data identifying work items associated with user stories of a project, defects of the project, test cases of the project, requirements from different tools of the project, whether the requirements are satisfied, and whether the requirements affect other requirements, as described above.

As further shown in FIG. 5, process 500 may include performing data cleansing to remove and/or modify particular words from the work item data and to generate cleansed work item data (block 520). For example, the device may perform data cleansing to remove and/or modify particular words from the work item data and to generate cleansed work item data, as described above.

In some implementations, the device may perform the data cleansing to remove repetitive words from the work item data, remove stop words from the work item data, remove hypertext tags from the work item data, and/or remove undesirable and/or vague words from the work item data. Alternatively, and/or additionally, the device may perform data cleansing by performing stemming and lemmatization to remove stems from root words of the work item data.

As further shown in FIG. 5, process 500 may include performing NLP on the cleansed work item data to identify synonyms for words in the cleansed work item data (block 530). For example, the device may perform NLP on the cleansed work item data to identify synonyms for words in the cleansed work item data, as described above. In some implementations, the device may identify matching words in the cleansed work item data and may perform NLP on the matching words to identify synonyms for the matching words.

As further shown in FIG. 5, process 500 may include replacing abbreviations in the cleansed work item data with full form text to generate final work item data (block 540). For example, the device may replace abbreviations in the cleansed work item data with full form text to generate final work item data, as described above. In some implementations, the device may utilize a repository of particular abbreviations associated with the project to replace the abbreviations in the cleansed work item data with the full form text and to generate the final work item data.

As further shown in FIG. 5, process 500 may include identifying keywords in the final work item data (block 550). For example, the device may identify keywords in the final work item data, as described above.

As further shown in FIG. 5, process 500 may include processing the final work item data, the synonyms, and the keywords, with a machine learning model, to identify mappings between work items of the final work item data and to determine a confidence score for the mappings, wherein the confidence score, for a plurality of the work items, provides a measure of similarity between the plurality of the work items (block 560). For example, the device may process the final work item data, the synonyms, and the keywords, with a machine learning model, to identify mappings between work items of the final work item data and to determine a confidence score for the mappings, as described above. In some implementations, the machine learning model is trained based on historical work item data associated with a plurality of historical projects, historical synonyms associated with the plurality of historical projects, and/or historical keywords associated with the plurality of historical projects.

The confidence score, for a plurality of the work items, may provide a measure of similarity between the plurality of the work items. In some implementations, the device may generate word embeddings based on the final work item data before processing the final work item data, the synonyms, and the keywords with the machine learning model.

In some implementations, the machine learning model may include a fuzzy model that utilizes a Levenshtein distance. The device may determine quantities of substitutions needed to transform textual strings of the final work item data into different textual strings. The device may determine Levenshtein distances between the textual strings and the different textual strings based on the quantities of substitutions. The device may identify the mappings between the work items of the final work item data based on the Levenshtein distances. The device may determine the confidence score for the mappings based on the Levenshtein distances.

As further shown in FIG. 5, process 500 may include performing one or more actions based on the mappings and the confidence score for the mappings (block 570). For example, the device may perform one or more actions based on the mappings and the confidence score for the mappings, as described above. In some implementations, the device may determine that the confidence score fails to satisfy a threshold. The device may recalculate the mappings based on determining that the confidence score fails to satisfy the threshold.

In some implementations, the device may provide the mappings and the confidence score to user devices associated with the work item data, provide information identifying the mappings and the confidence score for display, and/or may retrain the machine learning model based on the mappings and the confidence score. The device may receive feedback associated with one or more of the mappings and may modify the one or more mappings based on the feedback.

In some implementations, the device may identify a particular work item that needs attention based on the mappings and may provide an alert notification associated with the particular work item. Alternatively, and/or additionally, the device may determine a release date for a software product based on the mappings and may cause the software product to be put in production on the release date.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:
1. A method, comprising:
  receiving, by a device, work item data identifying work items associated with one or more of:
    a user story associated with a project,
    a defect associated with the project,
    a test case associated with the project,
    a requirement from a different tool of the project,
    a first identifier indicating whether the requirement is satisfied, or
    a second identifier indicating whether the requirement affects another requirement;
  performing, by the device, data cleansing to remove and/or modify particular words from the work item data and to generate cleansed work item data;
  performing, by the device, natural language processing on the cleansed work item data to identify synonyms for words in the cleansed work item data;
  replacing, by the device, abbreviations in the cleansed work item data with full form text to generate final work item data;
  identifying, by the device, keywords in the final work item data,
    wherein the final work item data includes work items of the final work item data;
  training, by the device, a machine learning model based on a neural network technique and using historical work item data associated with a plurality of historical projects, historical synonyms associated with the plurality of historical projects, and historical keywords associated with the plurality of historical projects to generate a trained machine learning model that is trained to identify mappings between the work items of the final work item data and to determine a confidence score for the mappings,
wherein the machine learning model includes a fuzzy model to identify the mappings;
processing, by the device, the final work item data, the synonyms, and the keywords, with the trained machine learning model, to identify the mappings and the confidence score,
wherein the confidence score, for a plurality of the work items, provides a measure of similarity between the plurality of the work items;
retraining, by the device, the trained machine learning model using the neural network technique and based on the mappings and the confidence score; and
performing, by the device, one or more actions based on the mappings and the confidence score for the mappings.

2. The method of claim 1, wherein performing the data cleansing to remove and/or modify the particular words from the work item data and to generate the cleansed work item data comprises one or more of:
performing the data cleansing to remove repetitive words from the work item data;
performing the data cleansing to remove stop words from the work item data;
performing the data cleansing to remove hypertext tags from the work item data; or
performing the data cleansing to remove vague words from the work item data.

3. The method of claim 1, wherein performing the data cleansing to remove and/or modify the particular words from the work item data and to generate the cleansed work item data comprises:
performing stemming and lemmatization to remove stems from root words included in the work item data.

4. The method of claim 1, wherein performing the natural language processing on the cleansed work item data to identify the synonyms for the words in the cleansed work item data comprises:
identifying matching words in the cleansed work item data; and
performing the natural language processing on the matching words to identify synonyms for the matching words.

5. The method of claim 1, wherein replacing the abbreviations in the cleansed work item data with the full form text to generate the final work item data comprises:
utilizing a repository of particular abbreviations associated with the project to replace the abbreviations in the cleansed work item data with the full form text and to generate the final work item data.

6. The method of claim 1, wherein the fuzzy model utilizes a Levenshtein distance.

7. The method of claim 1, wherein processing the final work item data, the synonyms, and the keywords, with the trained machine learning model, to identify the mappings between the work items of the final work item data and to determine the confidence score for the mappings comprises:
determining quantities of substitutions needed to transform textual strings of the final work item data into different textual strings;
determining Levenshtein distances between the textual strings and the different textual strings based on the quantities of substitutions;
identifying the mappings between the work items of the final work item data based on the Levenshtein distances; and
determining the confidence score for the mappings based on the Levenshtein distances.

8. A device, comprising:
one or more memories; and
one or more processors, coupled to the one or more memories, configured to:
receive work item data identifying work items associated with one or more of:
a user story associated with a project,
a defect associated with the project,
a test case associated with the project,
requirements from different tools of the project,
whether the requirements are satisfied, and
whether the requirements affect another requirement;
perform data cleansing to remove and/or modify particular words from the work item data and to generate cleansed work item data;
perform natural language processing on the cleansed work item data to identify synonyms for words in the cleansed work item data;
replace abbreviations in the cleansed work item data with full form text to generate final work item data;
identify keywords in the final work item data,
wherein the final work item data includes work items of the final work item data;
train a machine learning model based on a neural network technique and using historical work item data associated with a plurality of historical projects, historical synonyms associated with the plurality of historical projects, and historical keywords associated with the plurality of historical projects to generate a trained machine learning model that is trained to identify mappings between the work items of the final work item data and to determine a confidence score for the mappings,
wherein the machine learning model includes a fuzzy model to identify the mappings;
process the final work item data, the synonyms, and the keywords with the trained machine learning model to identify the mappings and the confidence score;
retrain the trained machine learning model using the neural network technique and based on the mappings and the confidence score; and
perform one or more actions based on the mappings and the confidence score for the mappings.

9. The device of claim 8, wherein the one or more processors are further configured to:
generate word embeddings based on the final work item data before processing the final work item data, the synonyms, and the keywords with the trained machine learning model.

10. The device of claim 8, wherein the one or more processors, to perform the one or more actions based on the mappings and the confidence score, are configured to one or more of:
provide the mappings and the confidence score to user devices associated with the work item data; or
provide information identifying the mappings and the confidence score for display.

11. The device of claim 8, wherein the one or more processors, to perform the one or more actions based on the mappings and the confidence score, are configured to:
identify a particular work item that needs attention based on the mappings; and provide an alert notification associated with the particular work item.

12. The device of claim 8, wherein the one or more processors, to perform the one or more actions based on the mappings and the confidence score, are configured to:
   determine a release date for a software product based on the mappings; and
   cause the software product to be put in production on the release date.

13. The device of claim 8, wherein the one or more processors, to perform the one or more actions based on the mappings and the confidence score, are configured to:
   receive feedback associated with one or more of the mappings; and
   modify the mappings based on the feedback.

14. The device of claim 8, wherein the one or more processors, to perform the one or more actions based on the mappings and the confidence score, are configured to:
   determine that the confidence score fails to satisfy a threshold; and
   recalculate the mappings based on determining that the confidence score fails to satisfy the threshold.

15. A non-transitory computer-readable medium storing a set of instructions, the set of instructions comprising:
   one or more instructions that, when executed by one or more processors of a device, cause the device to:
      receive work item data identifying work items associated with:
         user stories of a project,
         defects of the project,
         test cases of the project,
         requirements from different tools of the project,
         whether the requirements are satisfied, and
         whether the requirements affect other requirements;
      perform data cleansing to remove and/or modify particular words from the work item data and to generate cleansed work item data;
      perform natural language processing on the cleansed work item data to identify synonyms for words in the cleansed work item data;
      replace abbreviations in the cleansed work item data with full form text to generate final work item data;
      identify keywords in the final work item data,
         wherein the final work item data includes work items of the final work item data;
      train a machine learning model based on a neural network technique and using historical work item data associated with a plurality of historical projects, historical synonyms associated with the plurality of historical projects, and historical keywords associated with the plurality of historical projects to generate a trained machine learning model that is trained to identify mappings between the work items of the final work item data and to determine a confidence score for the mappings,
         wherein the machine learning model includes a fuzzy model to identify the mappings;
      process the final work item data, the synonyms, and the keywords with the trained machine learning model to identify the mappings and the confidence score;
      determine whether the confidence score for the mappings satisfies a threshold;
      cause the mappings to be utilized by user devices associated with the work item data; and
      retrain the trained machine learning model using the neural network technique and based on the mappings and the confidence score.

16. The non-transitory computer-readable medium of claim 15, wherein the one or more instructions, that cause the device to perform the data cleansing to remove and/or modify particular words from the work item data and to generate the cleansed work item data, cause the device to one or more of:
   perform the data cleansing to remove repetitive words from the work item data;
   perform the data cleansing to remove stop words from the work item data;
   perform the data cleansing to remove hypertext tags from the work item data;
   perform the data cleansing to remove absurd words from the work item data; or
   perform stemming and lemmatization to remove stems from root words of the work item data.

17. The non-transitory computer-readable medium of claim 15, wherein the one or more instructions, that cause the device to perform the natural language processing on the cleansed work item data to identify the synonyms for the words in the cleansed work item data, cause the device to:
   identify matching words in the cleansed work item data; and
   perform the natural language processing on the matching words to identify synonyms for the matching words.

18. The non-transitory computer-readable medium of claim 15, wherein the one or more instructions, that cause the device to process the final work item data, the synonyms, and the keywords, with the trained machine learning model, to identify the mappings between work items of the final work item data and to determine the confidence score for the mappings, cause the device to:
   determine quantities of substitutions needed to transform textual strings of the final work item data into different textual strings;
   determine Levenshtein distances between the textual strings and the different textual strings based on the quantities of substitutions;
   identify the mappings between the work items of the final work item data based on the Levenshtein distances; and
   determine the confidence score for the mappings based on the Levenshtein distances.

19. The non-transitory computer-readable medium of claim 15, wherein the one or more instructions further cause the device to:
   identify a particular work item that needs attention based on the mappings; and
   provide an alert notification associated with the particular work item.

20. The non-transitory computer-readable medium of claim 15, wherein the one or more instructions further cause the device to:
   determine a release date for a software product based on the mappings; and
   cause the software product to be put in production on the release date.

* * * * *